(12) United States Patent
Hurst

(10) Patent No.: US 8,725,580 B2
(45) Date of Patent: *May 13, 2014

(54) METHOD AND SYSTEM FOR ROUTING TRANSACTIONS TO A MOBILE-COMMERCE PLATFORM

(71) Applicant: Mocapay, Inc., Denver, CO (US)

(72) Inventor: Douglas J. Hurst, Niwot, CO (US)

(73) Assignee: Mocapay, Inc., Denver, CO (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/666,487

(22) Filed: Nov. 1, 2012

(65) Prior Publication Data

US 2013/0060688 A1 Mar. 7, 2013

Related U.S. Application Data

(63) Continuation of application No. 12/897,543, filed on Oct. 4, 2010, now Pat. No. 8,321,285.

(60) Provisional application No. 61/248,767, filed on Oct. 5, 2009.

(51) Int. Cl.
*G06Q 10/00* (2012.01)

(52) U.S. Cl.
USPC .......................................................... 705/21

(58) Field of Classification Search
None
See application file for complete search history.

(56) References Cited

U.S. PATENT DOCUMENTS 8,321,285 B1 * 11/2012 Hurst ............................. 705/21

* cited by examiner

*Primary Examiner* — Shay S Glass
(74) *Attorney, Agent, or Firm* — Holland & Hart LLP

(57) ABSTRACT

A method and system for routing transactions to a mobile-commerce platform is described. One illustrative embodiment receives, via a network, a purchase request from a user's mobile communication device; authenticates the user to the mobile-commerce platform; generates a one-time-use perishable transaction code associated with the purchase request; prefixes to the transaction code an Issuer Identification Number (IIN) corresponding to the mobile-commerce platform to form a combined number; returns the combined number to the user's mobile communication device via the network to enable the user to provide the combined number to a merchant's point-of-sale system in connection with a transaction corresponding to the purchase request; and receives, via a payment network in communication with the merchant's point-of-sale system, the transaction code and transaction details associated with the transaction, the IIN informing the payment network to route the one-time-use perishable transaction code and the transaction details to the mobile-commerce platform.

31 Claims, 8 Drawing Sheets

METHOD AND SYSTEM FOR ROUTING TRANSACTIONS TO A MOBILE-COMMERCE PLATFORM

PRIORITY

The present invention is a continuation of U.S. patent application Ser. No. 12/897,543, filed Oct. 4, 2010 by Hurst et al., entitled "Method and System for Routing Transactions to a Mobile-Commerce Platform", which claims priority from commonly owned and assigned U.S. Provisional Patent Application No. 61/248,767, filed on Oct. 5, 2009, each of which is incorporated herein by reference in their entirety for all purposes.

FIELD OF THE INVENTION

The present invention relates generally to electronic commerce. In particular, but not by way of limitation, the present invention relates to methods and systems for routing transactions to a mobile-commerce platform.

BACKGROUND OF THE INVENTION

Mobile-commerce platforms permit consumers to purchase goods or services from merchants using a wireless mobile device such as a cellular telephone. Some mobile-commerce platforms require merchants to install additional software in their point-or-sale (POS) systems to permit direct communication between the POS systems and the mobile-commerce platform over a network.

Some merchants, particularly larger merchants with many stores, are not always willing to install the necessary software in their POS systems to support such mobile-commerce platforms. This prevents consumers from making purchases via the mobile-commerce platform at some of the most well-known merchants. There is thus a need in the art to overcome this limitation.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for routing transactions to a mobile-commerce platform. One illustrative embodiment is a system for routing transactions to a mobile-commerce platform, comprising at least one processor; and a memory connected with the at least one processor, the memory containing a plurality of program instructions configured to cause the at least one processor to: receive, via a network, a purchase request from a user's mobile communication device; authenticate the user to the mobile-commerce platform; generate a one-time-use perishable transaction code associated with the purchase request; prefix to the one-time-use perishable transaction code an Issuer Identification Number (IIN) to form a combined number, the IIN corresponding to the mobile-commerce platform; return the combined number to the user's mobile communication device via the network to enable the user to provide the combined number to a merchant's point-of-sale system in connection with a transaction corresponding to the purchase request; and receive, via a payment network in communication with the merchant's point-of-sale system, the one-time-use perishable transaction code and transaction details associated with the transaction corresponding to the purchase request, the IIN informing the payment network to route the one-time-use perishable transaction code and the transaction details to the mobile-commerce platform.

Another illustrative embodiment is a computer-server-based method for routing transactions to a mobile-commerce platform, comprising receiving, via a network at the computer server, a purchase request from a user's mobile communication device, wherein the computer server is part of the mobile-commerce platform; authenticating the user to the mobile-commerce platform; generating a one-time-use perishable transaction code associated with the purchase request; prefixing to the one-time-use perishable transaction code an Issuer Identification Number (IIN) to form a combined number, the IIN corresponding to the mobile-commerce platform; returning the combined number to the user's mobile communication device via the network to enable the user to provide the combined number to a merchant's point-of-sale system in connection with a transaction corresponding to the purchase request; and receiving, via a payment network in communication with the merchant's point-of-sale system, the one-time-use perishable transaction code and transaction details associated with the transaction corresponding to the purchase request, the IIN informing the payment network to route the one-time-use perishable transaction code and the transaction details to the mobile-commerce platform.

Yet another illustrative embodiment is a computerized method for routing transactions to a mobile-commerce platform, comprising communicating with the mobile-commerce platform via a network using a mobile communication device to request a one-time-use perishable transaction code in connection with a purchase from a merchant; receiving, at the mobile communication device, a combined number from the mobile-commerce platform, the combined number including an Issuer Identification Number (IIN) and the one-time-use perishable transaction code, wherein the IIN is a prefix to the one-time-use perishable transaction code and the IIN corresponds to the mobile-commerce platform for transaction-routing purposes; and providing the combined number to the merchant's point-of-sale system.

The methods of the invention can also be embodied, at least in part, in a plurality of program instructions executable by at least one processor that are stored on a computer-readable storage medium.

These and other embodiments are described in further detail herein.

BRIEF DESCRIPTION OF THE DRAWINGS

Various objects and advantages and a more complete understanding of the present invention are apparent and more readily appreciated by reference to the following Detailed Description when taken in conjunction with the accompanying Drawings, wherein.

DETAILED DESCRIPTION

In various illustrative embodiments of the invention, the lack of a direct connection between a merchant's point-of-sale (POS) system and a mobile-commerce platform is overcome by preceding the mobile-commerce platform's one-time-use perishable transaction codes with an International Organization for Standardization (ISO) Issuer Identification Number (IIN). The consumer provides the combined IIN and transaction code to the merchant's POS system like a typical credit or debit card number, and the IIN enables the transaction to be routed to the mobile-commerce platform correctly via existing payment networks.

Figure 1:
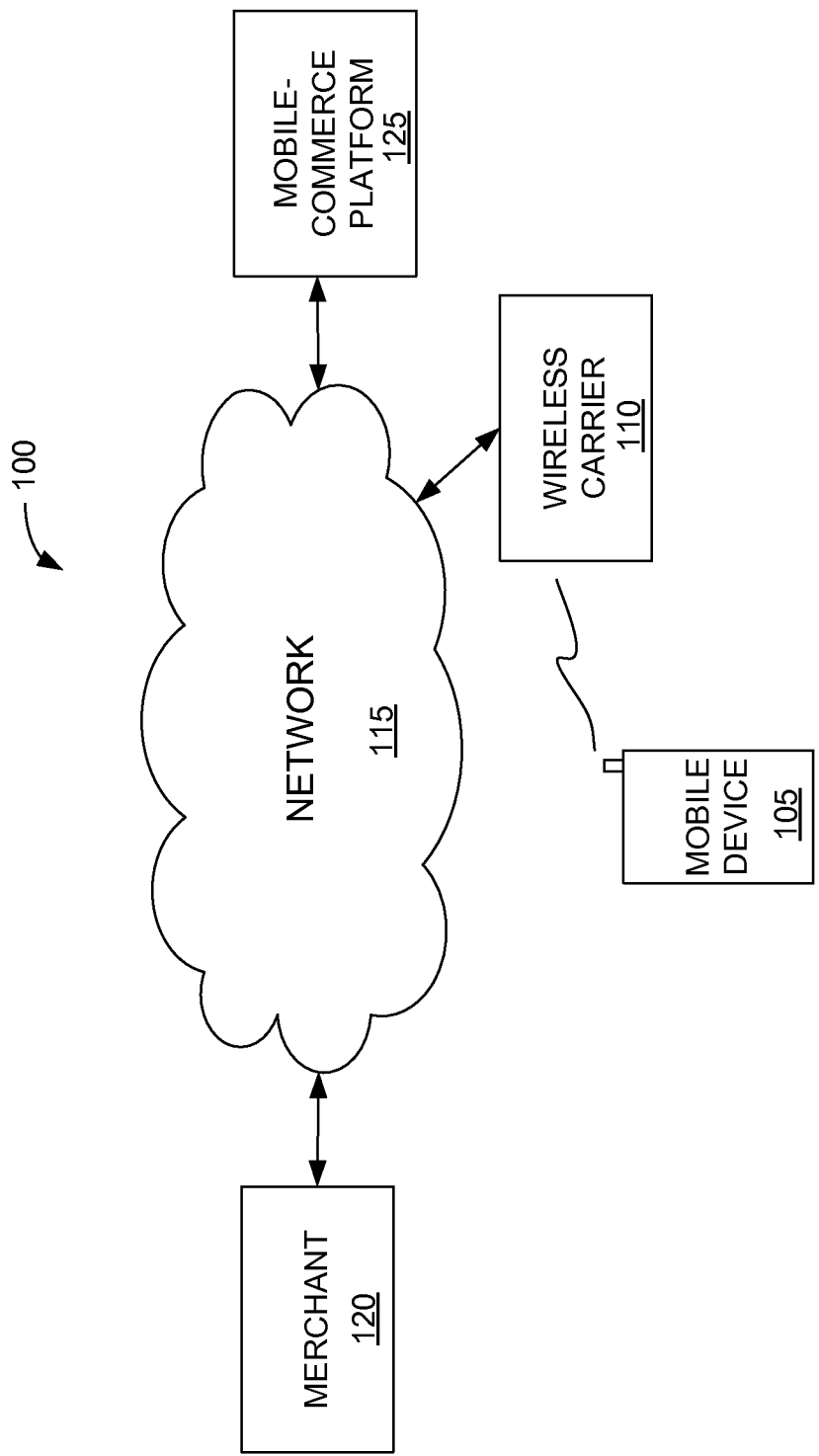
FIG. 1 is a functional block diagram of an environment in which various illustrative embodiments of the invention can be implemented.

Referring now to the drawings, where like or similar elements are designated with identical reference numerals throughout the several views, and referring in particular to FIG. 1, it is a functional block diagram of an environment 100 in which various illustrative embodiments of the invention can be implemented. Environment 100 includes network 115, which interconnects one or more merchants 120, one or more wireless carriers 110 (e.g., SPRINT, T-MOBILE, AT&T, etc.), and mobile-commerce platform 125. In some embodiments, network 115 includes, but is not necessarily limited to, the Internet. Merchant 120 sells goods, services, or both at traditional brick-and-mortar stores, on-line, or both at traditional brick-and-mortar stores and on-line.

Mobile device 105 associated with a particular user can communicate with the various nodes of network 115 via wireless carrier 110. Specifically, the user can use mobile device 105 to purchase goods or services from a merchant 120 by interacting with mobile-commerce platform 125 over network 115 in a manner that will be explained below. Depending on the particular embodiment, mobile device 105 can be a cellular telephone, Personal Communication Service (PCS) phone, Personal Digital Assistant (PDA), or other portable communication device.

Figure 2:
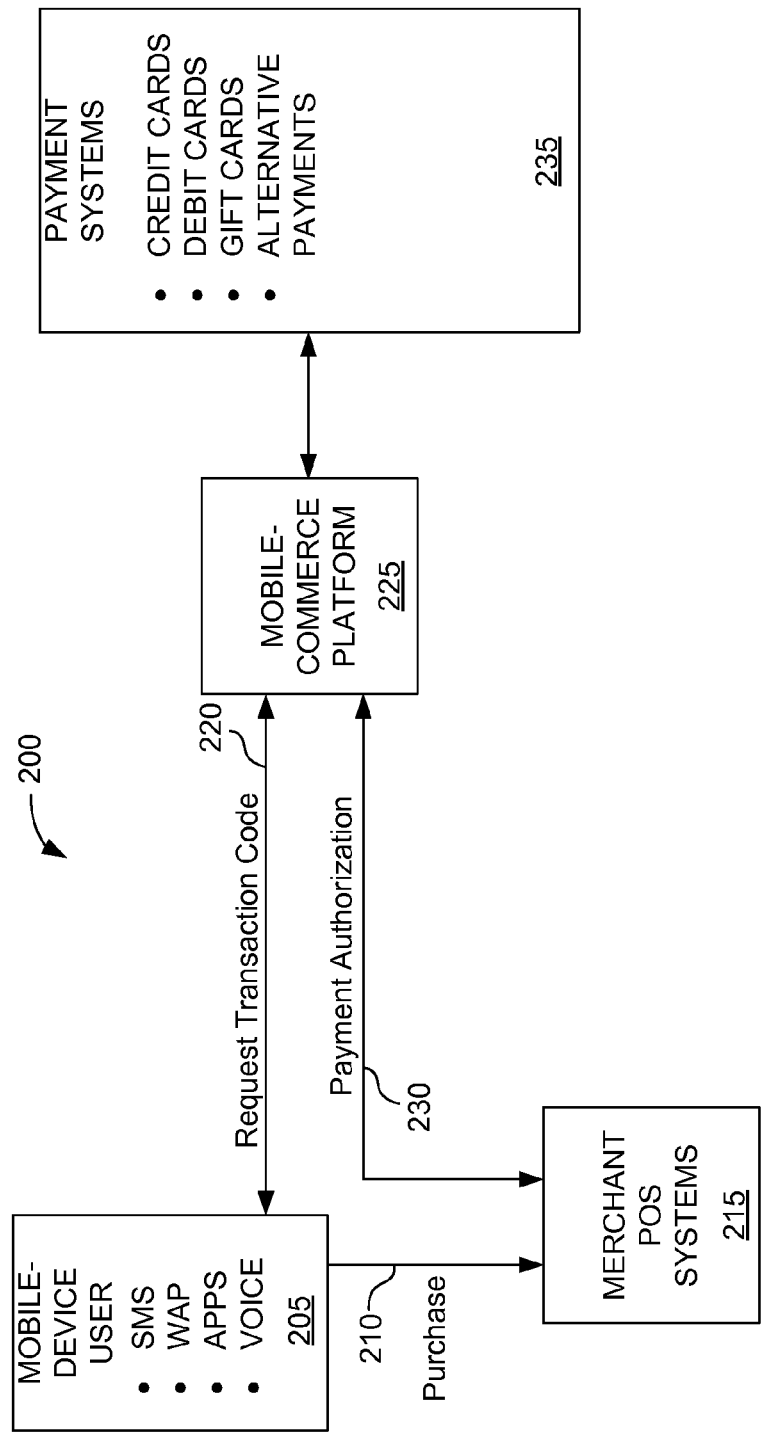
FIG. 2 is functional block diagram of a mobile-payment configuration in which a merchant point-of-sale (POS) system is in direct communication with a mobile-commerce platform.

FIG. 2 is functional block diagram of a mobile-payment configuration 200 in which a merchant POS system 215 is in direct communication with a mobile-commerce platform 225. In this configuration, the merchant has cooperated in installing software (e.g., an application programming interface or "API") in its POS system to support such direct communication with the mobile-commerce platform. Though the present invention concerns configurations in which such direct communication between the merchant's POS and the mobile-commerce platform is not available, the configuration shown in FIG. 2 is discussed first to lay the groundwork for a clearer understanding of the invention and its operation. In the discussion of FIG. 2 that follows, the various interactions among the parts of mobile-payment configuration 200 are identified by their corresponding reference numerals in parentheses.

Referring now to FIG. 2, mobile-device user 205 can use a variety of different access methods such as Short Message Service (SMS) messages, Multimedia Message Service (MMS) messages, Wireless Access Protocol (WAP), an application, or voice to obtain one-time-use perishable transaction codes (hereinafter "transaction codes") from mobile-commerce platform 225 in making payments to merchants using any of a variety of different tenders (220). Mobile-device user 205 can also use a variety of methods, including the above examples, to provide a transaction code to merchant POS 215 in making electronic purchases (210).

Merchant POS system 215 receives payment authorizations (230) from mobile-commerce platform 225, which communicates with various payment systems 235 in executing transactions (sales, credits, debits, transfers, etc.). Payment systems 235 typically include credit-card, debit-card, gift-card, and alternative-payment (e.g., PAYPAL) systems.

When mobile-device user 205 makes a purchase, mobile-device user 205 contacts mobile-commerce platform 225 using any of a variety of access methods (e.g., SMS, MMS, WAP or other browser technology, application, voice), and mobile-commerce platform 225 authenticates mobile-device user 205.

Mobile-commerce platform 225 provides mobile-device user 205 with transaction codes (220) and balances for various tenders available to that user. A given transaction code may be used only once in connection with a particular purchase, and it automatically expires (becomes invalid) if it is not used within a predetermined period after the user receives it. Mobile-device user 205 selects a specific tender (e.g., gift card, credit card, debit card, PAYPAL, etc.) to be used in making the purchase. The mobile-payments-enabled merchant submits, from merchant POS system 215, the transaction code provided by mobile-device user 205 and the transaction amount to mobile-commerce platform 225. Mobile-commerce platform 225 approves the transaction based on the merchant identifier, the transaction amount, and recognition of the transaction code. If everything checks out when mobile-commerce platform 225 executes the transaction with the applicable entity among payment systems 235, mobile-commerce platform 225 transmits a return authorization (230) to the merchant's POS system 215, completing the transaction.

Mobile-commerce platforms such as that just described above in connection with FIG. 2 are described in greater detail in U.S. Pat. No. 7,657,489, "Systems and Method for Secure Wireless Payment Transactions"; and U.S. patent application Ser. No. 12/343,423, "System and Method for Distributing Mobile Gift Cards"; both of which are incorporated herein by reference (both were included as appendixes in U.S. Provisional Application No. 61/248,767, cited above in the "Priority" section).

Figure 3:
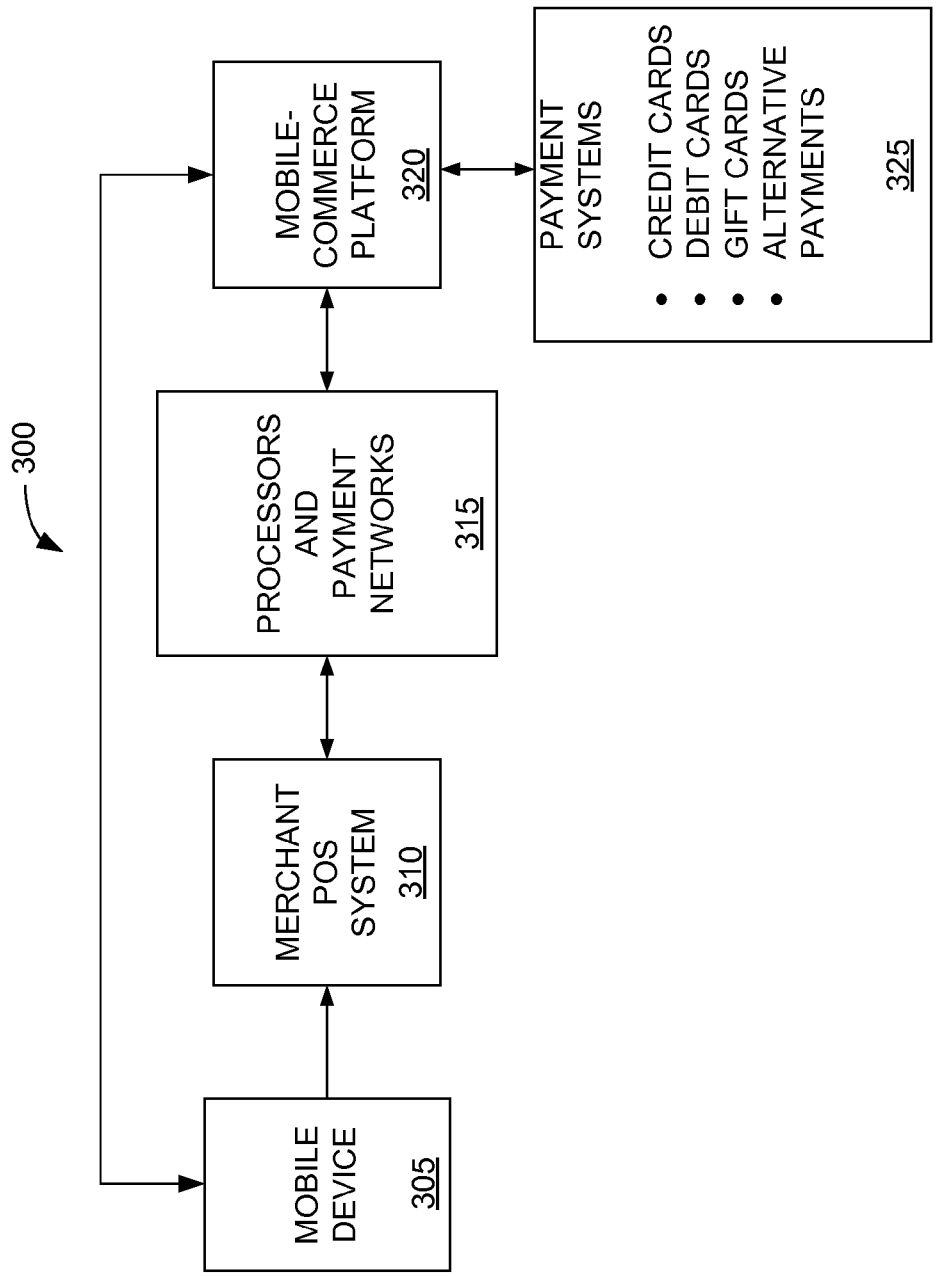
FIG. 3 is a functional block diagram of a mobile-payment configuration in which a merchant POS system and a mobile-commerce platform are not in direct communication in accordance with an illustrative embodiment of the invention.

FIG. 3 is a functional block diagram of a mobile-payment configuration 300 in which a merchant POS system 310 and a mobile-commerce platform 320 are not in direct communication in accordance with an illustrative embodiment of the invention. In this case, the merchant 120 (see FIG. 1) has not cooperated with the owners of mobile-commerce platform 320 in installing software (e.g., an API) in its POS system 310 to support direct communication with mobile-commerce platform 320. As indicated in FIG. 3, however, the user's mobile device 305 can still communicate wirelessly via network 115 with mobile-commerce platform 320 as in the configuration discussed above in connection with FIG. 2. Therefore, the user can still obtain transaction codes from mobile-commerce platform 320.

In the embodiment shown in FIG. 3, merchant POS system is in direct communication with processors and payments networks 315, as is typical of most merchants. "Processors" (or "acquirers") are third-party entities that process credit- and debit-card transactions for merchants. Examples include, without limitation, BANK OF AMERICA and TRANS-FIRST. Credit/debit card companies such as VISA, MASTERCARD, DISCOVER, and AMERICAN EXPRESS have their own payment networks to which such third-party processors can forward credit- or debit-card transactions received from merchants. Such payment networks are, in turn, connected with issuing banks (not shown in FIG. 3), in the case of VISA and MASTERCARD (banks are also involved in the case of DISCOVER and AMERICAN EXPRESS, but those banks are not the credit- or debit-card issuers).

In the credit/debit-card industry, the leading digits of the account number on the card, called the Issuer Identification Number (IIN), uniquely identifies the entity that issued the card and is used by acquirers/processors and payment networks to route transactions to the correct (issuing) entity over the network. IINs are assigned to issuing institutions in accordance with an International Organization for Standardization (ISO) standard. An IIN is typically six digits long. The entire credit/debit-card account number is typically 16 digits long for VISA and MASTERCARD and 15-18 digits long for DISCOVER and AMERICAN EXPRESS.

In the embodiment shown in FIG. 3, the owners of mobile-commerce platform 320 have established business relationships with one or more acquirers/processors and payment networks (VISA/MASTERCARD, DISCOVER/AMEX, etc.) to recognise an IIN that corresponds to mobile-commerce platform 320. This IIN permits transactions intended for mobile-commerce platform 320 to be routed, via existing payment networks (see 315 in FIG. 3), from merchant POS system 310 to mobile-commerce platform 320, thus obviating the need for direct communication between merchant POS 310 and mobile-commerce platform 320. Such an arrangement serves to route transactions to mobile-commerce platform 320 even though mobile-commerce platform 320 might not itself be a card-issuing entity.

Figure 4A:
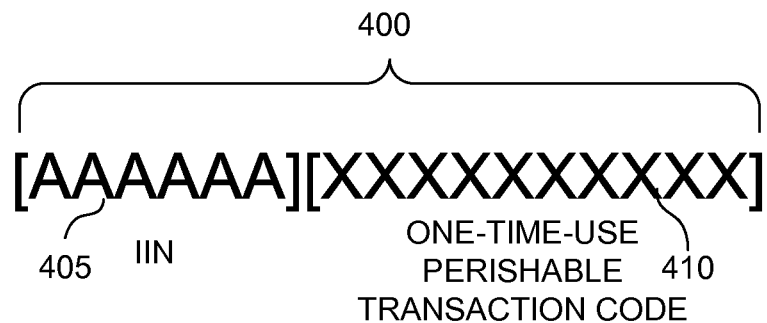
FIG. 4A is a diagram showing a combined Issuer Identification Number (IIN) and transaction code in accordance with an illustrative embodiment of the invention.

Referring to FIG. 4A, it is a diagram showing a combined Issuer Identification Number (IIN) and transaction code ("combined number") 400 in accordance with an illustrative embodiment of the invention. When a mobile-device user contacts mobile-commerce platform 320 to carry out a purchase from a merchant using mobile device 305, instead of returning to mobile device 305 just the transaction code discussed above in connection with FIG. 2, mobile-commerce platform 320 adds the IIN 405 corresponding to mobile-commerce platform 320 (symbolized as "AAAAAA" in FIG. 4A) to the transaction code 410 (symbolized as "XXXXXXXXXX" in FIG. 4A) as a prefix. For example, in one embodiment a six-digit IIN 405 is added as a prefix to a ten-digit transaction code 410 (one-time-use perishable transaction code used in approving transactions, as discussed above) to produce a 16-digit combined number 400, as illustrated in FIG. 4A.

Figure 4B:
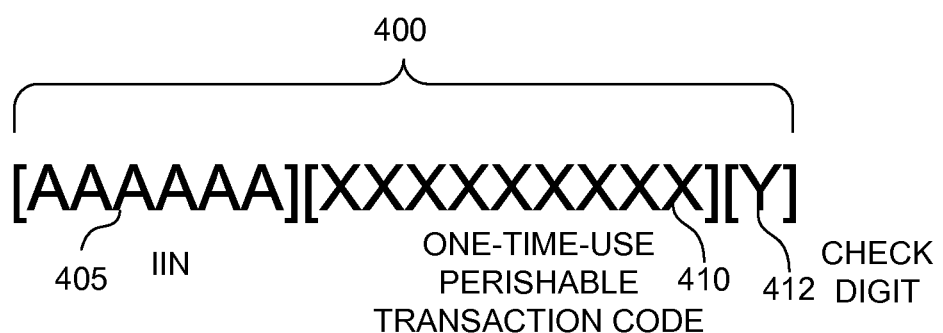
FIG. 4B is a diagram showing a combined Issuer Identification Number (IIN) and transaction code in accordance with another illustrative embodiment of the invention.

Referring next to FIG. 4B, in other embodiments, different length IINs and transaction codes can be used, and combined number 400 can include additional components. For example, in the illustrative embodiment shown in FIG. 4B, a transaction code 410 of from 9 to 12 digits, inclusive, is employed, and the last (rightmost) digit of combined number 400 is a check digit 412 (symbolized as "Y" in FIG. 4B).

Referring again to FIG. 3, mobile-commerce platform 320, upon receiving a transaction routed to it via processors and payment networks 315 by virtue of the added IIN 405 in combined number 400, communicates with payment systems 325 to execute the transaction. The step-by-step process of carrying out a sales transaction is discussed in greater detail below in connection with FIGS. 6A and 6B.

Figure 5:
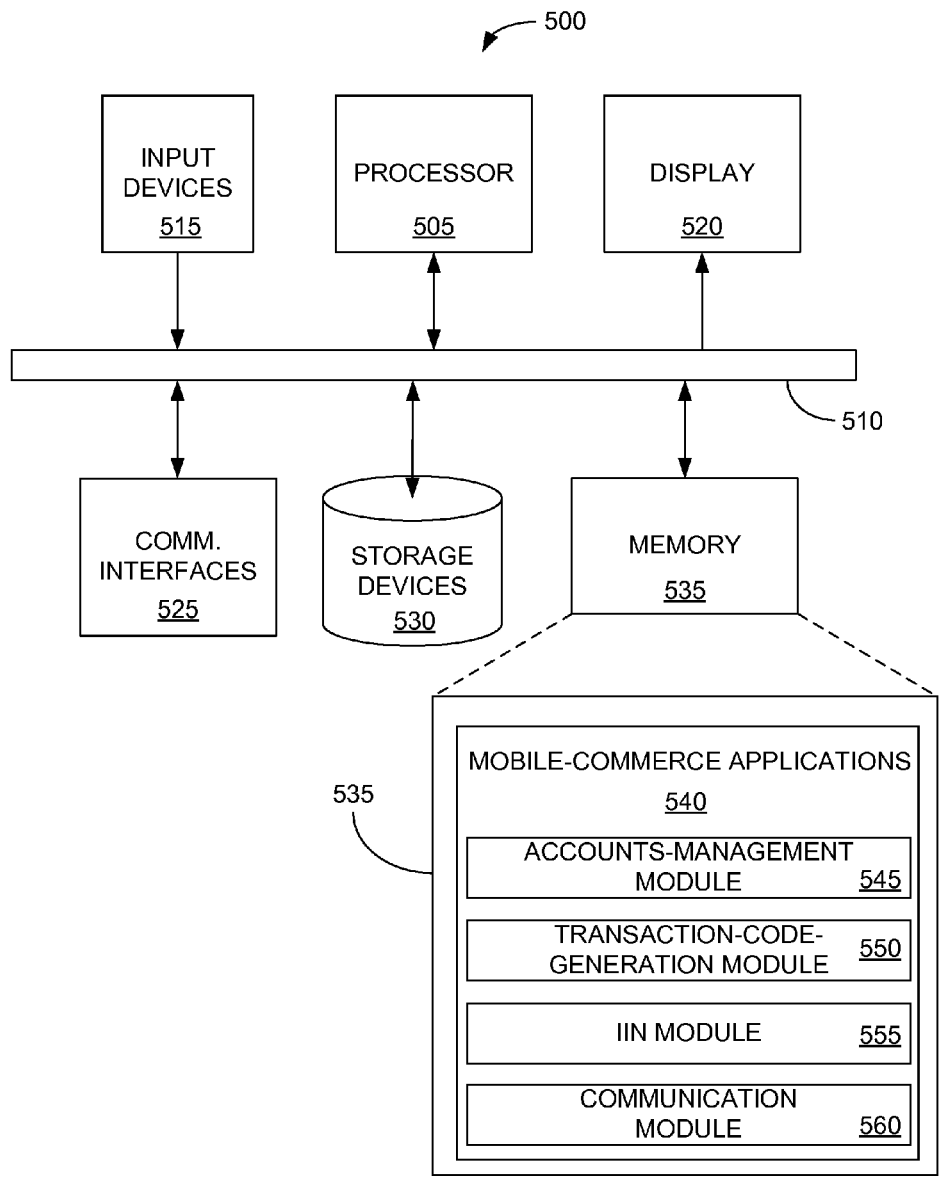
FIG. 5 is a functional block diagram of a computer server that hosts a mobile-commerce application suite in accordance with an illustrative embodiment of the invention.

Referring next to FIG. 5, it is a functional block diagram of a computer server ("server") 500 that hosts a mobile-commerce application suite in accordance with an illustrative embodiment of the invention. In this embodiment, server 500 is part of mobile-commerce platform 320 (see FIG. 3). In FIG. 5, processor 505 communicates over data bus 510 with input devices 515, display 520, communication interfaces ("COMM. INTERFACES" in FIG. 5) 525, storage devices 530 (e.g., hard disk drives or flash memory), and memory 535. Though FIG. 5 shows only a single processor, multiple processors or a multi-core processor may be present in some embodiments.

Input devices 515 include, for example, a keyboard, a mouse or other pointing device, or other devices that are used to input data or commands to server 500 to control its operation. Communication interfaces 525 may include, for example, various serial or parallel interfaces for communicating with network 115 (see FIG. 1) or one or more peripherals.

Memory 535 may include, without limitation, random access memory (RAM), read-only memory (ROM), flash memory, magnetic storage (e.g., a hard disk drive), optical storage, or a combination of these, depending on the particular embodiment. In FIG. 5, memory 535 includes mobile-commerce applications 540, which control and manage various aspects of the operation of mobile-commerce platform 320. Equipped with mobile-commerce applications 540, server 500 implements a server-side digital wallet to support mobile payments by users equipped with appropriately configured mobile devices 305. Each such user has a secure account on server 500.

Mobile-commerce applications 540 may be divided into various functional modules, depending on the particular embodiment. FIG. 5 depicts merely one example of how such functional modules can be identified. In other embodiments, there may be more or fewer functional modules, and they may be subdivided or combined differently or named differently in those other embodiments.

In FIG. 5, accounts-management module 545 manages user accounts, including the storage of user profile information and preferences and the management of the various forms of tenders available to a given user. Transaction-code-generation module 550 generates transaction codes 410. IIN module 555 adds the IIN 405 corresponding to mobile-commerce platform 320 to a transaction code 410. Communication module 560 handles communications over network 115 between server 500 and other systems such as a user's mobile device 305, processors and payment networks 315, and payment systems 325.

In one illustrative embodiment, mobile-commerce applications 540 are implemented as software that is executed by processor 505. Such software may be stored, prior to its being loaded into RAM for execution by processor 505, on any suitable computer-readable storage medium such as a hard disk drive, an optical disk, or a flash memory. In general, the functionality of server 500 may be implemented using a combination of hardware and software and/or firmware.

In some embodiments, server 500 is implemented using a single machine. In other embodiments, multiple machines are networked together to provide the needed functionality and performance.

Figure 6A:
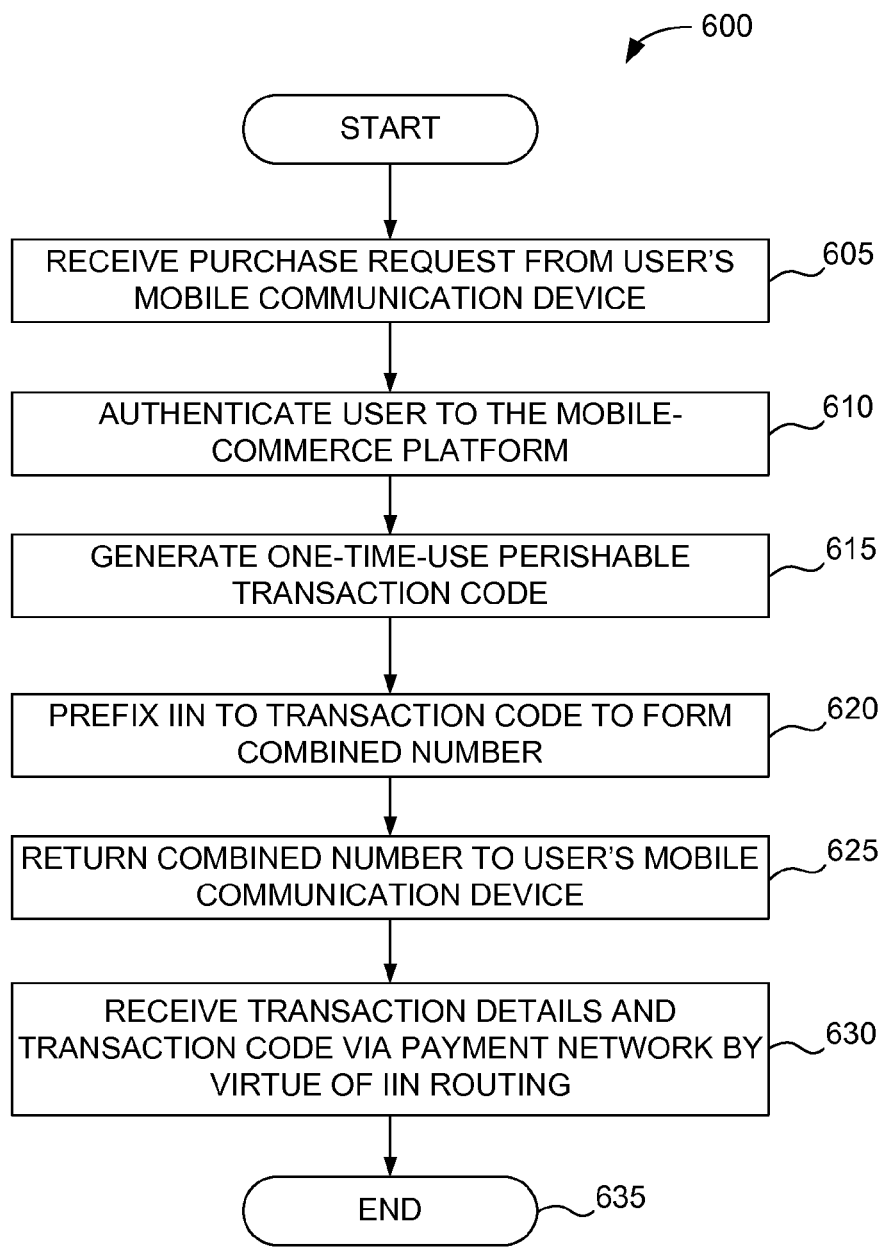
FIG. 6A is a flowchart of a method for routing transactions to a mobile-commerce platform in accordance with an illustrative embodiment of the invention.

Referring next to FIG. 6A, it is a flowchart of a method 600 for routing transactions to a mobile-commerce platform in accordance with an illustrative embodiment of the invention. Throughout the discussion of FIG. 6A that follows, frequent reference will also be made to FIGS. 1 and 3.

Method 600 begins with a mobile-device user contacting mobile-commerce platform 320 via network 115 using a mobile device 305. At 605, mobile-commerce platform 320 receives the user's request to make a purchase from a merchant 120. At 610, mobile-commerce platform 320 authenticates the user using, for example, an optional PIN and, in some embodiments, other factors such as the mobile communication device identifier of mobile device 305. Mobile-commerce platform 320 at 615, generates a transaction code 410, as explained above. At 620, mobile-commerce platform 320 adds IIN 405 to transaction code 410 as a prefix to form combined number 400 (see FIGS. 4A and 4B). At 625, mobile-commerce platform 320 returns the combined number 400 to mobile device 305. As explained above, the IIN 405 forms the leadings digits of the combined number 400 so it can serve as a mechanism for identifying mobile-commerce platform 320 and routing transactions to mobile-commerce platform 320 via processors and payment networks 315.

Next, the user provides the combined number 400 (IIN 405 and transaction code 410) to merchant POS system 310 by any of a variety of methods, including, without limitation, radio-frequency identification (RFID), WI-FI, BLUETOOTH, WIMAX, one or two-dimensional bar code (scanned from the display of mobile device 305), and voice (i.e., the user speaks combined number 400 to the merchant 120, who enters it into merchant POS system 310 using a keypad or other user interface).

Combined number 400 is transmitted from merchant POS system 310 to processors and payment networks 315. Based on the business relationships discussed above between the owners of mobile-commerce platform 320 and various processors and payment networks, processors and payment networks 315 route the transaction to mobile-commerce platform 320. At 630, mobile-commerce platform 320 receives the transaction details (amount, merchant, etc.) and transaction code 410 from processors and payment networks 315. Note that, in any given transaction, combined number 400 will typically pass through one processor and one payment network or through only one payment network, where the merchant POS system 310 is directly connected with the VISA/MASTERCARD or DISCOVER/AMEX payment network. At 635, method 600 terminates.

Figure 6B:
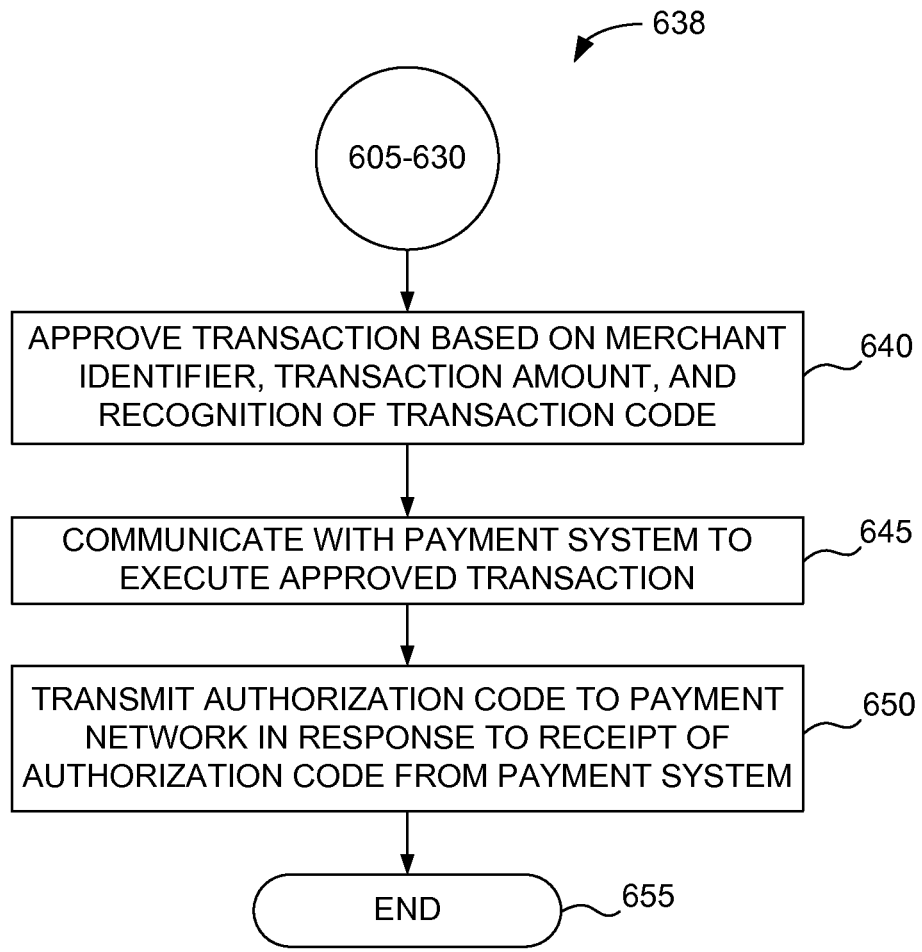
FIG. 6B is a flowchart of a method for routing transactions to a mobile-commerce platform in accordance with another illustrative embodiment of the invention.

Referring next to FIG. 6B, it is a flowchart of a method 638 for routing transactions to a mobile-commerce platform in accordance with another illustrative embodiment of the invention. The embodiment shown in FIG. 6B coincides with that shown in FIG. 6A through Block 630. Thus, the blocks preceding Block 630 in FIG. 6A have not been repeated in FIG. 6B.

At 640, mobile-commerce platform 320 bases approval of the received transaction on the merchant identifier, the transaction amount, and recognition of the transaction code 410. If the transaction is approved, mobile-commerce platform 320 communicates, at 645, with payment systems 325 to execute the transaction in accordance with me particular tender selected by the mobile-device user. If an authorization code (e.g., "00") comes back from the applicable payment system among payment systems 325 indicating that all is well with the transaction, mobile-commerce platform 320, at 650, transmits an authorization-code to the applicable payment network (see processors and payment networks 315 in FIG. 3), which forwards the authorization code to merchant POS system 310, completing the transaction. At 655, method 638 terminates.

Figure 7:
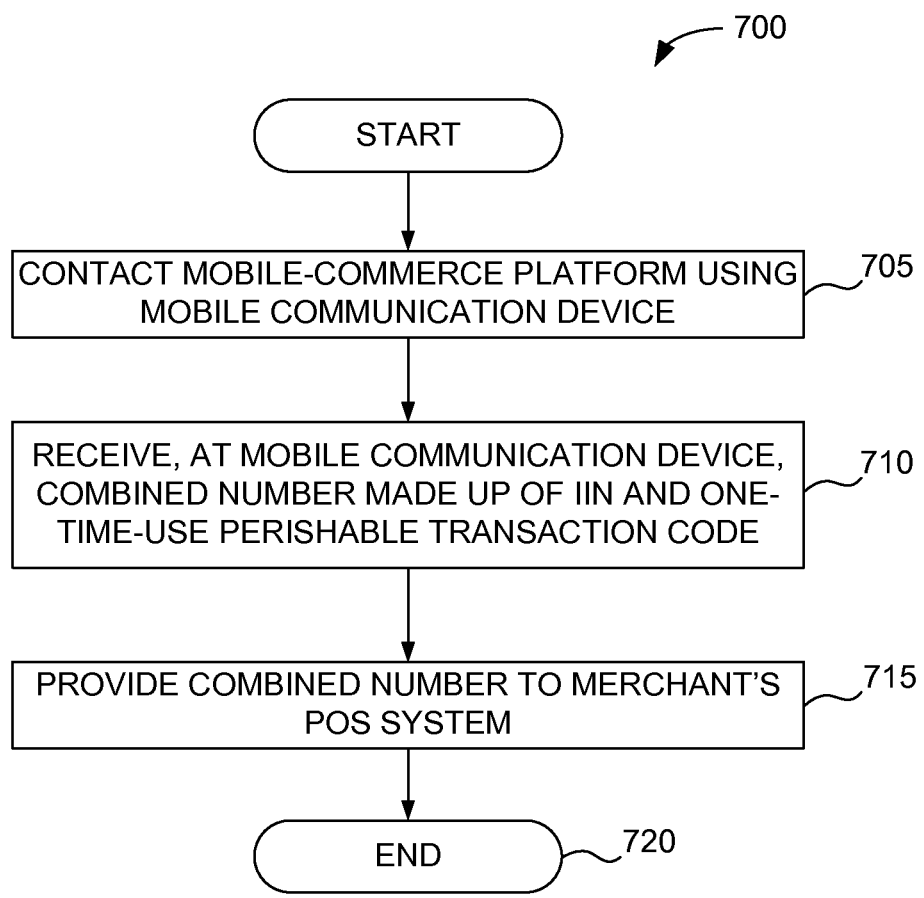
FIG. 7 is a flowchart of a method for routing transactions to a mobile-commerce platform in accordance with yet another illustrative embodiment of the invention.

Referring next to FIG. 7, it is a flowchart of a method 700 for routing transactions to a mobile-commerce platform 320 in accordance with yet another illustrative embodiment of the invention. FIG. 7 depicts the routing of a transaction to mobile-commerce platform 320 from the point of view of a mobile-device user making a purchase from a merchant 120.

At 705, the mobile-device user contacts mobile-commerce platform 320 via network 115 using a mobile device 305, as explained above. At 710, the mobile-device user receives the combined number 400 made up of IIN 405 and transaction code 410 (see FIGS. 4A and 4B) at his or her mobile device 305. At 715, the mobile-device user provides the combined number 400 to the merchant's POS system 310 like a typical credit or debit card number, as explained above.

As explained above, the IIN 405 in combined number 400 enables the transaction to be routed to mobile-commerce platform 320 via existing processors and payment networks 315, thereby overcoming the lack of a direct connection between merchant POS system 310 and mobile-commerce platform 320. At 720, method 700 terminates.

In conclusion, the present invention provides, among other things, a method and system for routing transactions to a mobile-commerce platform. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A system for routing transactions to a mobile-commerce platform, comprising:
   at least one processor; and
   a memory connected with the at least one processor, the memory containing a plurality of program instructions configured to cause the at least one processor to:
   receive, via a network, a transaction request from a user's mobile communication device;
   authenticate the user to the mobile-commerce platform;
   generate a one-time-use perishable transaction code associated with the transaction request;
   append to the one-time-use perishable transaction code an Issuer Identification Number (IIN) to form a combined number, the IIN corresponding to at least one tender associated with the user;
   return the combined number to the user's mobile communication device via the network to enable the device to provide the combined number to a system associated with a merchant in connection with a transaction corresponding to the transaction request; and
   receive the one-time-use perishable transaction code and transaction details associated with the transaction corresponding to the transaction request from the system associated with the merchant.

2. The system of claim 1, wherein the plurality of program instructions are further configured to cause the at least one processor to:

approve the transaction based on a merchant identifier, a transaction amount, and recognition of the received one-time-use perishable transaction code;

communicate with a payment system to execute the approved transaction with the at least one tender; and transmit an authorization code to a payment network in response to receipt of an authorization code from the payment system to enable the payment network to forward the transmitted authorization code to the system associated with the merchant to complete the transaction.

3. The system of claim 2, wherein the tender is one of a credit card, a debit card, a gift card, and an alternative-payment method.

4. The system of claim 2, wherein the payment system is one of a credit-card payment system, a debit-card payment system, a gift-card payment system, and an alternative-payment system.

5. The system of claim 1, wherein the user's mobile communication device is one of a cellular telephone, a Personal Communication Service (PCS) phone, and a Personal Digital Assistant (PDA).

6. The system of claim 1, wherein the IIN is six digits long and the combined number is at least 15 digits long.

7. The system of claim 1, wherein the mobile-commerce platform maintains an account for the user, the system acting as a server-side digital wallet for at least one tender associated with the user.

8. A computer-server-based method for routing transactions to a mobile-commerce platform, the computer-server-based method comprising:

receiving, via a network at the computer server, a transaction request from a user's mobile communication device, wherein the computer server is part of the mobile-commerce platform;

authenticating the user to the mobile-commerce platform;

generating a one-time-transaction request;

appending to the one-time-use perishable transaction code an Issuer Identification Number (IIN) to form a combined number, the IIN corresponding to a tender associated with the user;

returning the combined number to the user's mobile communication device via the network to enable the device to provide the combined number to system associated with a merchant in connection with a transaction corresponding to the transaction request; and receiving the one-time-use perishable transaction code and transaction details associated with the transaction corresponding to the transaction request from the system associated with the merchant.

9. The computer-server-based method of claim 8, further comprising:

approving the transaction based on a merchant identifier, a transaction amount, and recognition of the received one-time-use perishable transaction code;

communicating with a payment system to execute the approved transaction in accordance with the at least one tender; and transmitting an authorization code to a payment network in response to receipt of an authorization code from the payment system to enable the payment network to forward the transmitted authorization code to the system associated with the merchant to complete the transaction.

10. The computer-server-based method of claim 9, wherein the tender is one of a credit card, a debit card, a gift card, and an alternative-payment method.

11. The computer-server-based method of claim 9, wherein the payment system is one of a credit-card payment system, a debit-card payment system, a gift-card payment system, and an alternative-payment system.

12. The computer-server-based method of claim 8, wherein the user's mobile communication device is one of a cellular telephone, a Personal Communication Service (PCS) phone, and a Personal Digital Assistant (PDA).

13. The computer-server-based method of claim 8, wherein the IIN is six digits long and the combined number is at least 15 digits long.

14. The computer-server-based method of claim 8, wherein the mobile-commerce platform maintains an account for the user, the computer server acting as a server-side digital wallet for at least one tender associated with the user.

15. A computer-readable storage medium containing a plurality of program instructions executable by at least one processor to route transactions to a mobile-commerce platform, the plurality of program instructions being configured to cause the at least one processor to:

receive, via a network, a transaction request from a user's mobile communication device;

authenticate the user to the mobile-commerce platform;

generate a one-time-use perishable transaction code associated with the transaction request;

append to the one-time-use perishable transaction code an Issuer Identification Number (IIN) to form a combined number, the IIN corresponding to at least one tender associated with the user;

return the combined number to the user's mobile communication device via the network to enable the device to provide the combined number to a system associated with a merchant in connection with a transaction corresponding to the transaction request; and receive the one-time-use perishable transaction code and transaction details associated with the transaction corresponding to the transaction request from the system associated with the merchant.

16. The computer-readable storage medium of claim 15, wherein the plurality of program instructions are further configured to cause the al least one processor to:

approve the transaction based on a merchant identifier, a transaction amount, and recognition of the received one-time-use perishable transaction code;

communicate with a payment system to execute the approved transaction in accordance with the at least one a tender; and transmit an authorization code to a payment network in response to receipt of an authorization code from the payment system to enable the payment network to forward the transmitted authorization code to the system associated with the merchant to complete the transaction.

17. The computer-readable storage medium of claim 16, wherein the tender is one of a credit card, a debit card, a gift card, and an alternative-payment method.

18. The computer-readable storage medium of claim 16, wherein the payment system is one of a credit-card payment system, a debit-card payment system, a gift-card payment system, and an alternative-payment system.

19. The computer-readable storage medium of claim 15, wherein the user's mobile communication device is one of a cellular telephone, a Personal Communication Service (PCS) phone, and a Personal Digital Assistant (PDA).

20. The computer-readable storage medium of claim 15, wherein the IIN is six digits long and the combined number is at least 15 digits long.

21. The computer-readable storage medium of claim 15, wherein the mobile-commerce platform maintains an account for the user, a computer server associated with the mobile-commerce platform acting as a server-side digital wallet for at least one tender associated with the user.

22. A computerized method for routing transactions to a mobile-commerce platform, the computerized method comprising:
   communicating with the mobile-commerce platform via a network using a mobile communication device to request a one-time-use perishable transaction code in connection with a transaction from a merchant;
   receiving, at the mobile communication device, a combined number from the mobile-commerce platform, the combined number including an Issuer Identification Number (IIN) and the one-time-use perishable transaction code, wherein the IIN is appended to the one-time-use perishable transaction code and the IIN corresponds to at least one tender associated with the user; and
   providing the combined number to a system associated with the merchant.

23. The computerized method of claim 22, wherein the IIN causes the one-time-use perishable transaction code and transaction details associated with the purchase to be routed to the mobile-commerce platform via a payment network connected with the system associated with the merchant.

24. The computerized method of claim 22, wherein the mobile-commerce platform maintains an account for the user, a computer server associated with the mobile-commerce platform acting as a server-side digital wallet for at least one tender associated with the user.

25. The computerized method of claim 24, wherein the at least one tender is one of a credit card, a debit card, a gift card, and an alternative-payment method.

26. The computerized method of claim 22, wherein the mobile communication device is one of a cellular telephone, a Personal Communication Service (PCS) phone, and a Personal Digital Assistant (PDA).

27. The computerized method of claim 22, wherein the IIN is six digits long and
   the combined number is at least 15 digits long.

28. The system of claim 1, wherein the plurality of program instructions are further configured to cause the at least one processor to:
   receive the one-time use perishable transaction code from a payment network in communication with the system associated with the merchant.

29. The system of claim 28, wherein the IIN informs the payment network to route the one-time-use perishable transaction code and the transaction details to the mobile-commerce platform.

30. The method of claim 9, further comprising: receiving the one-time use perishable transaction code from a payment network in communication with the system associated with the merchant.

31. The method of claim 30, wherein the IIN informs the payment network to route the one-time-use perishable transaction code and the transaction details to the mobile-commerce platform.

* * * * *